US009607463B2

(12) United States Patent
Cai et al.

(10) Patent No.: US 9,607,463 B2
(45) Date of Patent: Mar. 28, 2017

(54) BILL RECYCLING MECHANISM

(71) Applicant: SHANDONG NEW BEIYANG INFORMATION TECHNOLOGY CO., LTD, Weihai (CN)

(72) Inventors: Bing Cai, Weihai (CN); Zhenxing Zhao, Weihai (CN); Yong Yuan, Weihai (CN); Shuxun Dong, Weihai (CN)

(73) Assignee: Shandong New Beiyang Information Technology Co., Ltd., Weihai (CN)

( * ) Notice: Subject to any disclaimer, the term of this patent is extended or adjusted under 35 U.S.C. 154(b) by 3 days.

(21) Appl. No.: 14/648,548

(22) PCT Filed: Dec. 4, 2013

(86) PCT No.: PCT/CN2013/088497
§ 371 (c)(1),
(2) Date: May 29, 2015

(87) PCT Pub. No.: WO2014/086288
PCT Pub. Date: Jun. 12, 2014

(65) Prior Publication Data

US 2015/0310691 A1 Oct. 29, 2015

(30) Foreign Application Priority Data

Dec. 7, 2012 (CN) .......................... 2012 1 0524559

(51) Int. Cl.
*G07F 7/04* (2006.01)
*G07D 11/00* (2006.01)
(Continued)

(52) U.S. Cl.
CPC ......... *G07D 11/0021* (2013.01); *B65H 29/26* (2013.01); *B65H 31/02* (2013.01);
(Continued)

(58) Field of Classification Search
CPC .. G07D 11/0018; G07D 7/00; G07D 11/0009; G07D 2207/00; G07D 2211/00;
(Continued)

(56) References Cited

U.S. PATENT DOCUMENTS 1,682,254 A * 8/1928 Rorabache ............ E05F 15/622
292/DIG. 12
2,366,048 A * 12/1944 Opalek ................. E05F 17/004
318/256
(Continued)

FOREIGN PATENT DOCUMENTS

CN 101527060 A 9/2009
CN 102542703 A 7/2012
(Continued)

OTHER PUBLICATIONS

English translation of Takada JP2008128321A.*
International Search Report for counterpart PCT Application No. PCT/CN2013/088497, dated Mar. 6, 2014 (8 pgs.).

*Primary Examiner* — Jeffrey Shapiro
(74) *Attorney, Agent, or Firm* — Shumaker & Sieffert, P.A.

(57) ABSTRACT

The invention discloses a bill recycling mechanism, which includes a box body, provided with a bill outlet; a bill tray, including a first door and a second door, which are oppositely arranged, and used for receiving and guiding bills to the bill outlet; and a double door driving assembly, used for driving the first door and the second door to be opened or closed, wherein the first door and the second door are pivotally opened and pivoted into a bill storage space below the first door and the second door. According to the bill recycling mechanism, the bills directly fall into the bill storage space below the double doors when the first door and the second door are opened, so that a bill recycling speed is increased.

11 Claims, 4 Drawing Sheets

(51) Int. Cl.

| | |
|---|---|
| ***B65H 29/26*** | (2006.01) |
| ***B65H 31/02*** | (2006.01) |
| ***B65H 31/36*** | (2006.01) |
| *B65H 29/00* | (2006.01) |
| *B65H 31/30* | (2006.01) |

(52) U.S. Cl.
CPC ......... *B65H 31/3018* (2013.01); *B65H 31/36* (2013.01); *G07D 11/0003* (2013.01); *G07D 11/009* (2013.01); *G07D 11/0018* (2013.01); *B65H 29/00* (2013.01); *B65H 31/30* (2013.01); *B65H 31/3009* (2013.01); *B65H 2301/4212* (2013.01); *B65H 2301/4314* (2013.01); *B65H 2402/441* (2013.01); *B65H 2403/46* (2013.01); *B65H 2404/1114* (2013.01); *B65H 2405/11152* (2013.01); *B65H 2511/20* (2013.01); *B65H 2511/51* (2013.01); *B65H 2513/53* (2013.01); *B65H 2701/1912* (2013.01); *G07D 11/0024* (2013.01); *G07D 11/0081* (2013.01)

(58) Field of Classification Search
CPC . G07D 7/06; G07D 7/12; G07D 11/00; G07D 11/0033; G07D 11/0006; G07D 11/0012; G07D 11/0021; G07D 11/0024; G07D 11/0045; G07D 11/0051; G07D 11/0054; G07D 11/0057; G07D 11/006; G07D 11/0063; G07D 11/0066; G07F 1/02; G07F 9/10; G07F 1/00; G07F 9/06; G07F 9/006; G07F 9/02; G07F 1/04; G07F 17/08; G07F 9/04; B65H 2701/1912; B65H 2301/4314; B65H 2301/4213; B65H 29/00; B65H 31/30; B65H 31/3063; B65H 31/3081; B65H 31/309; B65H 2301/42266; B65H 2301/42268; B65H 29/40; B65H 31/32; B65H 33/16; B65H 33/18; B65H 29/34; B65H 31/3009; B65H 31/3018; B65H 2405/321; B65H 2405/3211; B65H 2405/322; B65H 2405/323; B65H 2405/3231; B65H 2405/324; B65H 9/00; B65H 9/004; B65H 2301/33; B65H 29/42; B65H 2301/3121; B65H 29/44; B65H 29/46; B65H 31/06; B65H 83/00; B65H 85/00; B65H 9/002; B65H 2301/30; B65H 9/04; B65H 9/06; B65H 9/101; B65G 57/00; B65G 57/32; B65G 61/00; Y10S 414/103; Y10S 414/104; Y10S 414/105; G07B 15/00; G07B 15/066; G07B 11/09; A45C 1/12; G06Q 20/1085
USPC ................ 194/206, 207, 350, 351; 235/379; 209/534; 232/7–15; 902/8–17; 271/3.01, 271/177–181, 225, 233, 234, 245, 248; 414/788, 789.9, 790.3, 790.4, 790.5, 414/790.8, 791.5
See application file for complete search history.

(56) References Cited

U.S. PATENT DOCUMENTS

| | | | | | |
|---|---|---|---|---|---|
| 4,697,071 | A * | 9/1987 | Hiraoka | G07D 11/0021 | 209/534 |
| 4,787,518 | A * | 11/1988 | Yuge | G07D 11/0084 | 209/534 |
| 4,949,651 | A * | 8/1990 | Frank | G07F 7/005 | 109/24.1 |
| 6,588,569 | B1 * | 7/2003 | Jenrick | G07F 19/202 | 194/200 |
| 2001/0015309 | A1 * | 8/2001 | Ikuta | G07D 11/0012 | 194/206 |
| 2005/0077347 | A1 * | 4/2005 | Uematsu | E05G 1/00 | 235/379 |
| 2010/0230232 | A1 * | 9/2010 | Uesaka | G07D 11/0084 | 194/206 |
| 2012/0111694 | A1 * | 5/2012 | Nutzel | G07D 11/0018 | 194/207 |
| 2013/0001040 | A1 * | 1/2013 | Iwamura | G07D 11/0066 | 194/206 |

FOREIGN PATENT DOCUMENTS

| | | | | |
|---|---|---|---|---|
| CN | 102750793 A | | 10/2012 | |
| JP | 58192168 A | | 11/1983 | |
| JP | 2008128321 A1 | * | 6/2008 | F16C 11/10 |

* cited by examiner

BILL RECYCLING MECHANISM

This application is a national stage entry under 35 U.S.C. §371 of International Application No. PCT/CN2013/088497, filed Dec. 4, 2013, which claims the benefit of CN Application 201210524559.5, filed Dec. 7, 2012. The entire contents of International Application No. PCT/CN2013/088497 and CN Application 201210524559.5 are incorporated herein by reference.

TECHNICAL FIELD

The invention relates to a bill recycling mechanism.

BACKGROUND

Self-service terminal equipment is generally provided with a bill outlet and a bill recycling mechanism. For example, an automatic teller machine is provided with a banknote outlet and a banknote recycling mechanism, a banknote is conveyed to the banknote outlet for a user to take, and if the user does not take the banknote after a preset time, the banknote recycling mechanism recovers the banknote into a recycling box for storage; an automatic ticket vending machine is provided with a ticket outlet and a ticket recycling mechanism, a ticket is conveyed to the ticket outlet for the user to take, and if the user does not take the ticket after a preset time, the ticket recycling mechanism recovers the ticket into a recycling box for storage; and self-service check processing equipment arranged in a bank hall is provided with a check outlet, a check is conveyed to a check outlet for the user to take after being processed, and if the user does not take the check after a preset time, a check recycling mechanism recovers the check into a recycling box for storage.

Chinese patent CN200420094380.1 discloses a banknote recycling mechanism, and as shown in FIG. 1, the banknote recycling mechanism includes a banknote receiving plate assembly, a rocker 4', a worm gear-worm set 3' and a motor 5', wherein the banknote receiving plate assembly comprises a banknote receiving plate 6', a base 7', a conveying belt 1', a bracket 2' and two rotating shafts; the bottom of the base 7' is connected with the bracket 2'; the banknote receiving plate 6' is supported by the base 7 ', and is staggered with the conveying belt 1'; the two rotating shafts are arranged at the two ends of the bracket 2'; the conveying belt 1' is supported by the two rotating shafts; a roller 41' is arranged at one end of the rocker 4', and supports the base 7'; and a worm gear of the worm gear-worm set 3' is arranged at the other end of the rocker 4', and a worm of the worm gear-worm set 3' is fixedly connected with an output shaft of the motor 5'.

When the motor 5' drives the worm gear-worm set 3' to drive the rocker 4' to rotate to a first set position, the roller 41' of the rocker 4' supports the base 7', the base 7' lifts the bracket 2', and then banknotes can be received on the banknote stacking plate 6'; and when the motor 5' drives the worm gear-worm set 3' to drive the rocker 4' to rotate to a second set position, the roller 41' of the rocker 4' is separated from the base 7', the bracket 2' rotates to a position communicated with a recycling box (not shown in FIG. 1) under the action of gravity, and the conveying belt l' can convey the banknotes into the recycling box.

During the recycling of the banknote recycling mechanism, the banknotes can be conveyed into the recycling box by lifting the base 7' and driving the conveying belt to move, which causes the problems of multiple operation steps and low recycling speed.

SUMMARY

The invention is intended to provide a bill recycling mechanism capable of rapidly recovering bills.

To this end, the invention provides a bill recycling mechanism, which comprises: a box body, provided with a bill outlet; a bill tray, comprising a first door and a second door, which are oppositely arranged, and used for receiving and guiding bills to the bill outlet; and a double door driving assembly, used for driving the first door and the second door to be opened or closed, wherein the first door and the second door are pivotally opened and pivoted into a bill storage space below the first door and the second door.

Furthermore, the double door driving assembly comprises a transmission shaft, and a first worm and a second worm, which are axially arranged on the transmission shaft, wherein a first worm gear which forms a first worm gear-worm set with the first worm is arranged on a hinge of the first door, a second worm gear which forms a second worm gear-worm set with the second worm is arranged on a hinge of the second door, and a turning direction of the first worm is opposite to a turning direction of the second worm.

Furthermore, the double door driving assembly further comprises a gear fixedly connected with the transmission shaft and a motor in transmission connection with the gear.

Furthermore, the bill tray is obliquely arranged, the double door driving assembly is positioned on an upper end side of the bill tray, and a lower end side of the bill tray is communicated with the bill outlet.

Furthermore, the bill tray is provided with a first stopping side plate arranged on the first door and a second stopping side plate arranged on the second door.

Furthermore, the box body further comprises a baffle plate on the side, close to the bill outlet, of the bill tray, wherein a gate sliding way is formed between the baffle plate and the bill outlet, and a gate which opens and closes the bill outlet is arranged along the gate sliding way.

Furthermore, the gate sliding way is a curved sliding way, the gate is a curved gate, and the bill outlet includes an outer opening formed in a panel of the box body, a passage wall extending inwards from four sides of the outer opening and an inner opening formed in the tail end of the passage wall and closed by the curved gate.

Furthermore, the bill recycling mechanism further comprises a detection component which is arranged on the bill tray and used for detecting the bills.

Furthermore, the bill recycling mechanism further comprises a rotating shaft arranged above the bill tray, a impeller arranged on the rotating shaft and used for stirring the bills, and a impeller driving assembly in transmission connection with the rotating shaft.

Furthermore, the bill storage space is formed by a box body with an opening, and the first door and second door of the bill tray are used for closing the opening of the box body.

According to the bill recycling mechanism provided by the invention, the bills directly fall into the bill storage space below the double doors when the double doors are opened, so that a bill recycling speed is increased; and furthermore, the first door and the second door are driven by the worm gear-worm sets, and can be self-locked, and an illegal person cannot press the first door or the second door to open the double doors to take the bills recovered in the box body, so that the bill recycling mechanism provided by the invention is high in safety.

Besides the purpose, characteristics and advantages described above, the invention has other purposes, characteristics and advantages, which are further described with the drawings in detail.

BRIEF DESCRIPTION OF DRAWINGS

The drawings forming a part of the specification and used for further understanding the invention show preferred embodiments of the invention, and are adopted to describe the principle of the invention together with the specification. In the drawings.

DESCRIPTION OF REFERENCES IN THE DRAWINGS

1. bill tray; 2. double door driving assembly;
3. detection component; 4. impeller assembly;
81. front wall;
82. left wall; 83. right wall;
84. rear wall; 85. bottom plate;
811. panel; 812. baffle plate;
812*a*. paper retaining part; 842. perpendicular part;
841. inclined part; 11. first door;
12. second door; 113. first stopping side plate;
111. first hinge; 112. second hinge;
121. third hinge; 122. fourth hinge;
123. second stopping side plate; 21. motor;
22. gear; 23. transmission shaft;
24. first worm gear-worm set; 25. second worm gear-worm set;
211. motor gear; 241. first worm;
242. first worm gear; 251. second worm;
252. second worm gear; 41. impeller;
42. rotating shaft; 43. driving gear;
5. gate assembly; 811*a*. left sidewall;
811*b*. upper sidewall; 811*c*. lower sidewall;
51. gate; 52. pivoting shaft; and
53. gate driving assembly.

DETAILED DESCRIPTION

The embodiment of the invention is described below with reference to the drawings in detail, but the invention can be implemented by various modes defined and covered by claims.

Figure 1:
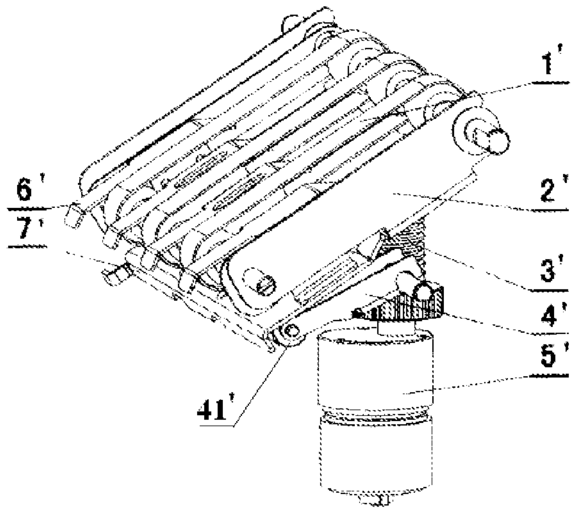
FIG. 1 is a structure view of a banknote recycling mechanism provided by Chinese patent CN200420094380.1.
Figure 2:
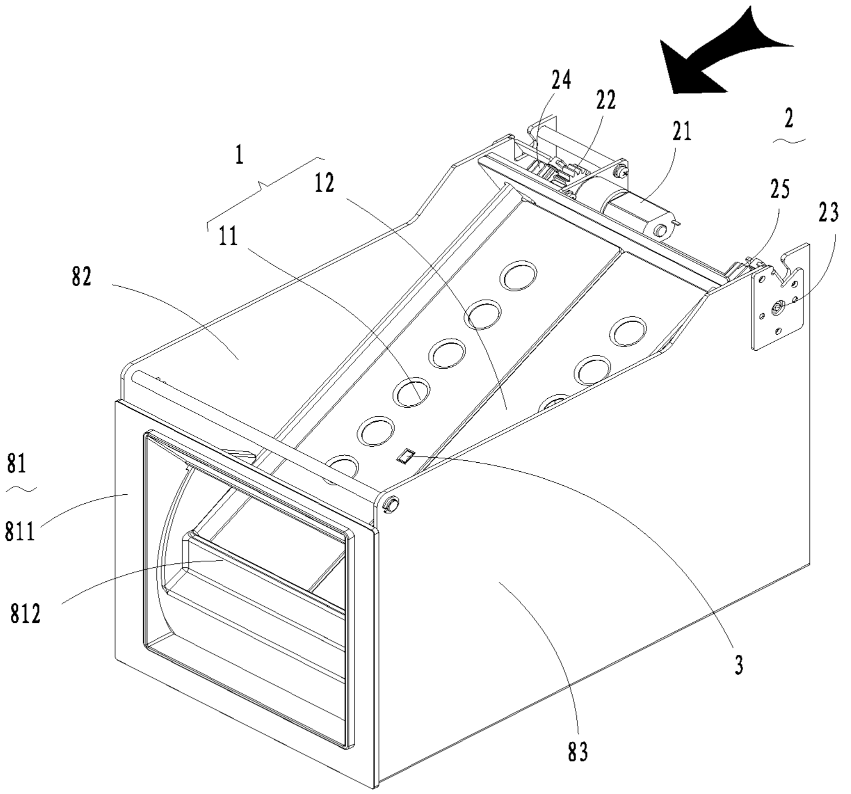
FIG. 2 is an isometric structure view of a bill recycling mechanism according to a first embodiment of the invention.
Figure 3:
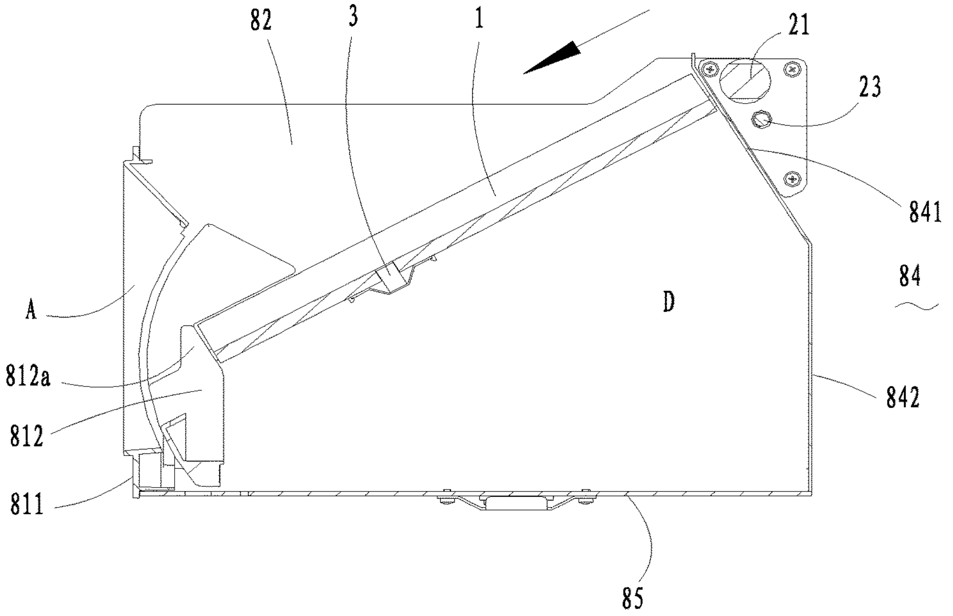
FIG. 3 is a structural section view of a bill recycling mechanism according to a first embodiment of the invention.

FIG. 2 is an isometric structure view of a bill recycling mechanism according to a first embodiment of the invention, and FIG. 3 is a structural section view of a bill recycling mechanism according to a first embodiment of the invention. As shown in FIG. 2 and FIG. 3, the bill recycling mechanism comprises a box body, a bill tray 1, a double door driving assembly 2 and a detection component 3.

The box body comprises a front wall 81, a left wall 82, a right wall 83, a rear wall 84 and a bottom plate 85, wherein the left wall 82 and the right wall 83 are oppositely arranged in parallel and at a preset distance along a width direction of the box body; the front wall 81 and the rear wall 84 are oppositely arranged at a preset distance along a length direction of the box body; the bottom plate 85 is positioned below the front wall 81, the left wall 82, the right wall 83 and the rear wall 84, and is perpendicularly and fixedly connected with the front wall 81, the left wall 82, the right wall 83 and the rear wall 84; the front wall 81, the left wall 82, the right wall 83, the rear wall 84 and the bottom plate 85 form a storage space with an upper opening together; and bills enter the storage space in a direction (as shown by arrows in FIG. 2 and FIG. 3) from back to front from a part above the box body. Wherein, the front wall 81 comprises a panel 811 and a baffle plate 812, left and right sides of the panel 811 are connected with the left wall 82 and the right wall 83 respectively, a lower part of the panel 811 is connected with the bottom plate 85, and a bill outlet A is formed in the panel 811; the baffle plate 812 is fixedly connected with the side, close to the bottom plate 85, of the bill outlet A in the panel 811, extends into the storage space, and includes a paper retaining part 812*a* which is arranged at an included angle with the bottom plate 85; and the rear wall 84 includes a perpendicular part 842 perpendicularly connected with the bottom plate 85 and an inclined part 841 arranged at an included angle with the bottom plate 85, wherein the inclined part 841 is positioned on an upper part of the rear wall 84, and is arranged in parallel and at a preset distance with the paper retaining part 812*a* of the baffle plate 812.

The bill tray 1 is positioned between the inclined part 841 of the rear wall 84 and the paper retaining part 812*a* of the baffle plate 812, and is used for receiving and guiding the bills to the bill outlet A. The bill tray 1 includes a first door 11 and a second door 12, which are oppositely arranged to form side-by-side doors, wherein the first door 11 and the second door 12 are arranged in parallel between the left wall 82 and the right wall 83 along the width direction of the box body, both extend along a direction perpendicular to the paper retaining part 812*a* of the box body, and are arranged between the paper retaining part 812*a* of the box body and the inclined part 841 of the rear wall 84 in a way that front parts are lower and rear parts are higher.

Wherein, the sum of a width of the first door 11 and a width of the second door 12 is adapted to a width of the storage space (i.e. a distance between the left wall 82 and the right wall 83). Preferably, each of the width of the first door 11 and the width of the second door 12 is adapted to a half of the width of the storage space. A first hinge 111 (see FIG. 4) and a second hinge 112 (see FIG. 5) are coaxially arranged on the side, close to the left wall 82, of the first door 11, and the first door 11 is pivoted to the inclined part 841 of the rear wall 84 through the first hinge 111, and is pivoted to the paper retaining part 812*a* of the baffle plate 812 through the second hinge 112, can rotate within a set angle range around axes of the first hinge 111 and the second hinge 112, and has an open position and a closed position; and a third hinge 121 (see FIG. 4) and a fourth hinge (see FIG. 4)

are coaxially arranged on the side, close to the right wall 83, of the second door 12, and the second door 12 is pivoted to the inclined part 841 of the rear wall 84 through the third hinge 121, is pivoted to the paper retaining part 812*a* of the baffle plate 812 through the fourth hinge 122, can rotate within a set angle range around axes of the third hinge 121 and the fourth hinge 122, and has an open position and a closed position.

When the first door 11 and the second door 12 are both at the closed positions, the first door 11 and the second door 12 are jointed in parallel and positioned above the bottom plate 85, and form a closed storage space for bill recycling together with the left wall 82, the right wall 83, the baffle plate 812 of the front wall 81, the rear wall 84 and the bottom plate 85; and when the first door 11 and the second door 12 are both at the open positions, the first door 11 and the second door 12 are deflected into the storage space for bill recycling, a top of the storage space for bill recycling is open, and the bills can enter the storage space. Preferably, the first door 11 and the second door 12 are both L-shaped, wherein a first stopping side plate 113 is arranged on the first door 11, a second stopping side plate 123 is arranged on the second door 12, and the first stopping side plate 113 and the second stopping side plate 123 are oppositely arranged, and form a box body with an upper opening and capable of receiving the bills together with the baffle plate 812 of the front wall 81 and the inclined part 841 of the rear wall 84.

Figure 4:
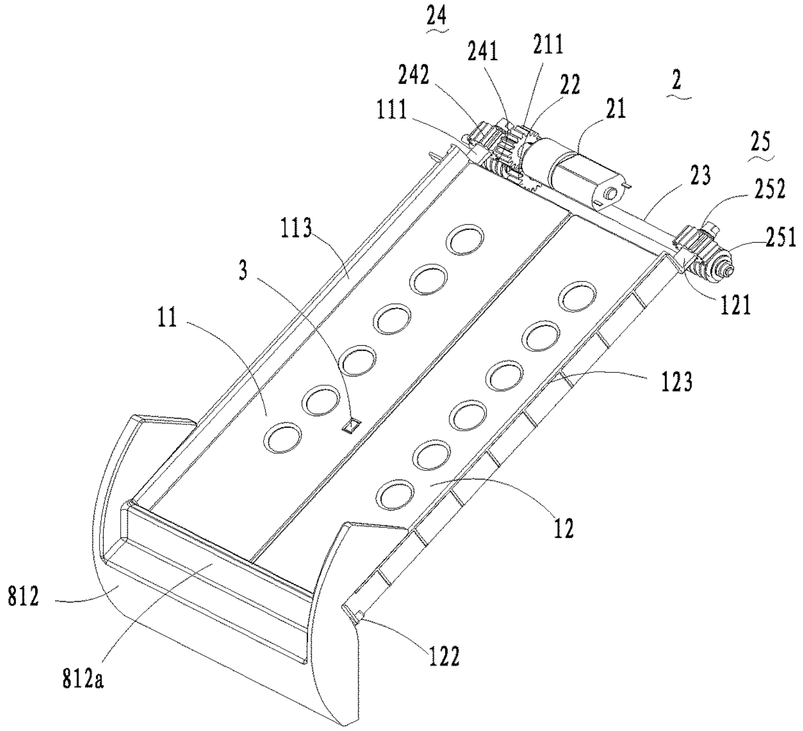
FIG. 4 is a first local view of a bill recycling mechanism when double doors are at closed positions according to a first embodiment of the invention.
Figure 5:
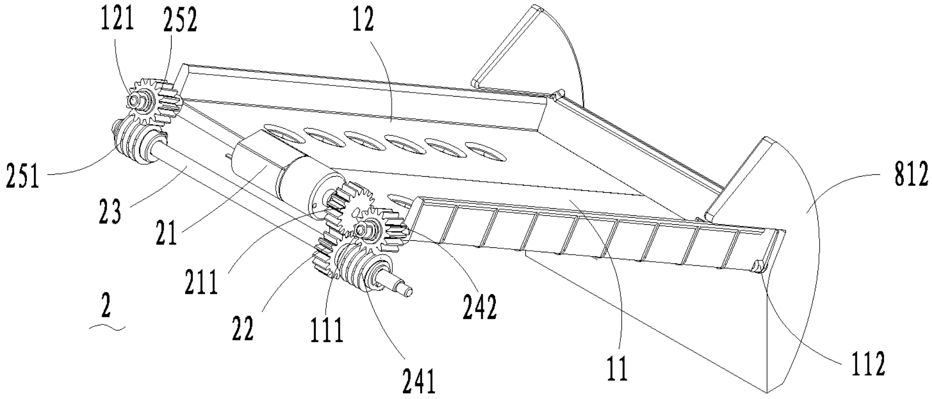
FIG. 5 is a second local view of a bill recycling mechanism when double doors are at closed positions according to a first embodiment of the invention.

FIG. 4 is a first local view of a bill recycling mechanism when double doors are at closed positions according to a first embodiment of the invention, and FIG. 5 is a second local view of a bill recycling mechanism when double doors are at closed positions according to a first embodiment of the invention. As shown in FIG. 4 and FIG. 5, the double door driving assembly 2 is used for driving the first door 11 and the second door 12 to synchronously rotate in opposite directions within the set angle ranges to be simultaneously at the open positions or the closed positions.

The double door driving assembly 2 comprises a motor 21, a gear 22, a transmission shaft 23, a first worm gear-worm set 24 and a second worm gear-worm set 25. Wherein, the motor 21 is fixedly arranged on the box body, and a motor gear 211 is fixedly arranged on an output shaft of the motor 21; the transmission shaft 23 is supported by the left wall 82 and right wall 83 of the box body, and can freely rotate around its own axis; and the gear 22 is fixed on the transmission shaft 23, is meshed with the motor gear 211, and can drive the transmission shaft 23 to rotate around its axis through the motor gear 211 and the gear 22 when the output shaft of the motor 21 rotates.

The first worm gear-worm set 24 is used for driving the first door 11 to rotate between the open position and the closed position, and includes a first worm 241 and a first worm gear 242, wherein the first worm 241 is fixedly arranged at the end, close to the first door 11, of the transmission shaft 23, the first worm gear 242 is fixedly arranged on the first hinge 111 of the first door 11, and the first worm 241 is meshed with the first worm gear 242; and the second worm gear-worm set 25 is used for driving the second door 12 to rotate between the open position and the closed position, and includes a second worm 251 and a second worm gear 252, wherein the second worm 251 is fixedly arranged at the end, close to the second door 12, of the transmission shaft 23, a turning direction of a helix of the second worm 251 is opposite to a turning direction of a helix of the first worm 241, the second worm gear 252 is fixedly arranged on the third hinge 121 of the second door 12, and the second worm 251 is meshed with the second worm gear 252.

When the motor 21 drives the transmission shaft 23 to rotate around its own axis along a set direction, the first worm 241 and the second worm 251, which are fixedly arranged on the transmission shaft 23, synchronously rotate along with the transmission shaft 23, the first worm 241 drives the first worm gear 242 meshed with the first worm 241 and the first hinge 111 to rotate around an axis of the first hinge 111 along the set direction to make the first door 11 synchronously rotate along the set direction along with the first hinge 111, and the second worm 251 drives the second worm gear 252 meshed with the second worm 251 and the third hinge 121 to rotate around an axis of the third hinge 121 along a direction opposite to the set direction to make the second door 12 synchronously rotate along the direction opposite to the set direction along with the third hinge 121, that is, the second door 12 synchronously rotates in an opposite direction relative to the first door 11, and is at the open position or the closed position synchronously with the first door 11.

The detection component 3 is arranged on the bill tray 1, and is used for detecting whether there are bills on the bill tray 1 or not. Preferably, the detection component 3 is positioned at the end, close to the bill outlet A, of the bill tray 1. The detection component 3 may be a photoelectric sensor as well as a mechanical sensor, and in the embodiment, the detection component 3 is a photoelectric sensor, is arranged on the side, close to the second door 12, of the first door 11, outputs a first detection signal such as a low level when there are bills on the bill tray 1, and outputs a second detection signal such as a high level when there are no bills on the bill tray 1.

A working process of the bill recycling mechanism provided by the invention is introduced below.

In an initial state, the first door 11 and the second door 12 are all at the closed positions, the bills fall on the bill tray 1 when the bills are conveyed into the storage space from a part above the rear part of the bill recycling mechanism, and under the action of gravity, front ends of the bills contact with the paper retaining part 812*a* of the baffle plate 812 for a user to take away from the bill outlet A.

Figure 6:
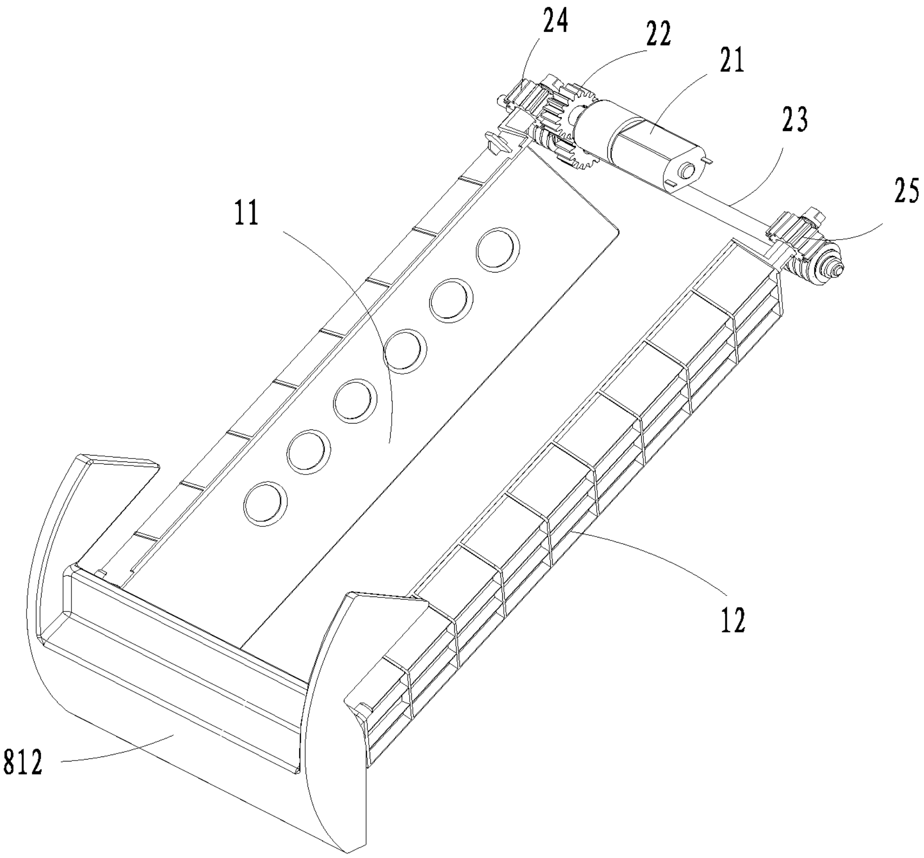
FIG. 6 is a local view of a bill recycling mechanism when double doors are at open positions according to a first embodiment of the invention.

A controller (not shown in the figures) of the bill recycling mechanism detects an output signal of the detection component 3 after a preset time, if the detection component 3 outputs the first detection signal, it is indicated that there are bills on the bill tray 1, that is, the bills stored on the first door 11 and the second door 12 have not been taken, as shown in FIG. 6, the controller controls the motor 21 of the double door driving assembly 2 to rotate along the set direction to drive the first door 11 and the second door 12 to synchronously rotate to the open positions in opposite directions along a direction for entering the storage space through the motor gear 211, the gear 22, the transmission shaft 23, the first worm gear-worm set 24 and the second worm gear-worm set 25, and then the bills fall into the recovered bill storage space.

Then, the controller controls the motor 21 to rotate along the direction opposite to the set direction to drive the first door 11 and the second door 12 to synchronously rotate to the closed positions in opposite directions along a direction for withdrawal from the storage space to close the recovered bill storage space through the motor gear 211, the gear 22, the transmission shaft 23, the first worm gear-worm set 24 and the second worm gear-worm set 25.

The double doors of the bill recycling mechanism provided by the invention are driven by the worm gears and the worms to rotate to the open positions, and then the bills fall into the box body under the action its own gravity. Compared with the prior art, the bill recycling mechanism provided by the invention has the advantages that the bills directly fall into the box body when the double doors are opened, so that the bill recycling speed is increased; in addition, a bill recycling function can be realized by only one motor, so that the cost of the bill recycling mechanism is lowered; and furthermore, the first door and the second door are both connected with the worm gears, worm gear-worm transmission has a self-locking property, and an illegal person cannot press the first door or the second door to open the double doors to take the bills recovered in the box body, so that the bill recycling mechanism provided by the invention is high in safety.

Figure 7:
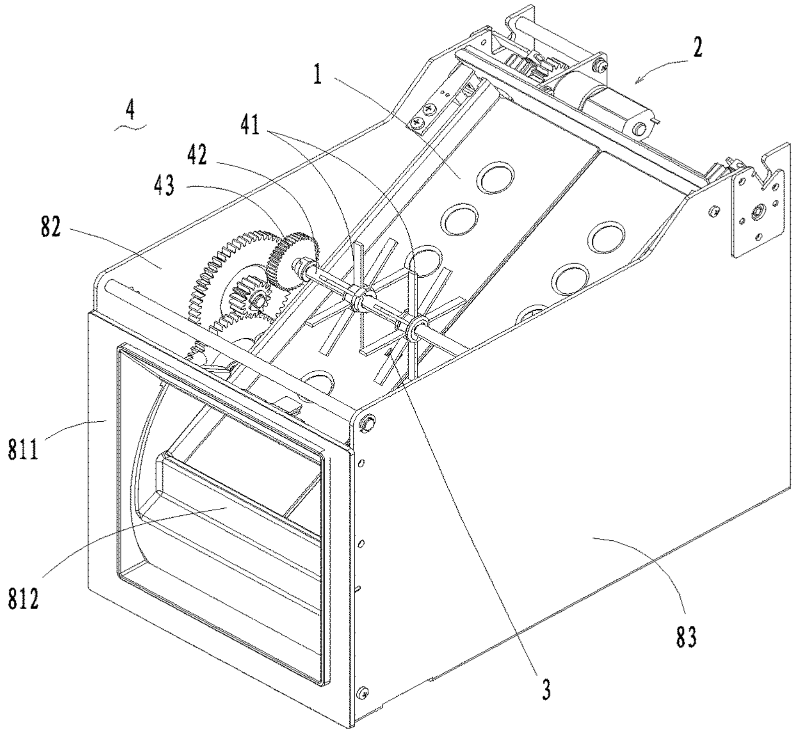
FIG. 7 is an isometric structure view of a bill recycling mechanism according to a second embodiment of the invention.

FIG. 7 is an isometric structure view of a bill recycling mechanism according to a second embodiment of the invention. As shown in FIG. 7, a difference between the embodiment and the previous embodiment is that the bill recycling mechanism in the embodiment further comprises a impeller assembly 4.

The impeller assembly 4 comprises at least one impeller 41, a rotating shaft 42 and a impeller driving assembly, wherein the rotating shaft 42 is supported by the left wall 82 and right wall 83 of the box body, is positioned above the bill tray 1, is arranged in the centre along a length direction of the bill tray 1, and can freely rotate around its own axis; the impeller driving assembly comprises a driving gear 43 and a motor (not shown in FIG. 7), wherein the driving gear 43 is fixedly arranged at one end of the rotating shaft 42, and is in transmission connection with the motor, and when the motor drives the driving gear 43 to rotate, the rotating shaft 42 can be driven to rotate along with the driving gear 43; and the at least one impeller 41 fixedly sleeves the rotating shaft 42, and is made from a wear-resistant flexible material, a free end of the impeller 41 contacts with an upper surface of the bill tray 1, and when the rotating shaft 42 rotates along a bill conveying direction, the impeller 41 rotates along with the rotating shaft 42, the free end of the impeller 41 drives the bills on the bill tray 1 to move towards the paper retaining part 812*a* of the front wall 81, and the bills are aligned along the paper retaining part 812*a*. The impeller assembly 4 in the embodiment comprises two impellers 41, which are arranged on the rotating shaft 42 symmetrically about a width centre of the box body.

According to the embodiment, the impellers are arranged, and when bills falling in the bill recycling mechanism are different in length, the impellers rotate to drive the bills to move and align front ends of the bills, and the front ends of the bills can also be aligned when the bills fall in the recovered bill storage space, so that the bills can be orderly recovered.

Figure 8:
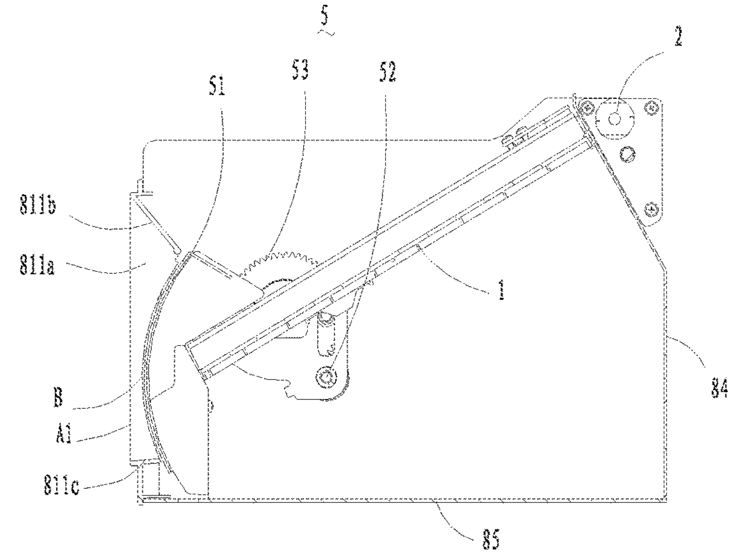
FIG. 8 is a structural section view of a bill recycling mechanism according to a third embodiment of the invention.

FIG. 8 is a structural section view of a bill recycling mechanism according to a third embodiment of the invention. As shown in FIG. 8, a difference between the embodiment and the above embodiments is that the bill recycling mechanism provided by the embodiment further comprises a gate assembly 5.

Specifically, an outer opening A1 is formed in the panel 811, and a left sidewall 811*a*, a right sidewall (not shown in FIG. 8), an upper sidewall 811*b* and a lower sidewall 811*c* are arranged on peripheral sides of the outer opening A1, wherein the left sidewall 811*a* and the right sidewall extend into the storage space relatively in parallel, and the sides, away from the outer opening A1, of the left sidewall 811*a* and the right sidewall are circular; and the upper sidewall 811*b* and the lower sidewall 811*c* are both positioned between the left sidewall 811*a* and the right sidewall, and are connected with two ends of the circular sides of the left sidewall 811*a* and the right sidewall respectively, the ends, away from the outer opening A1, of the left sidewall 811*a*, the right sidewall, the upper sidewall 811*b* and the lower sidewall 811*c* form an inner opening B, and the outer opening A1 is communicated with the inner opening B to form the bill outlet. Preferably, the outer opening is a rectangular opening, and the inner opening is a curved opening.

The gate assembly 5 comprises a gate 51, a pivoting shaft 52 and a gate driving assembly 53, wherein the gate 51 is shaped into a circular surface, the shape of the circular surface is matched with the shape of the inner opening B of the panel 811, the gate 51 is pivoted to the left wall 82 and right wall 83 of the box body through the pivoting shaft 52, and can rotate around the pivoting shaft 52 to open or close the inner opening B; and the gate driving assembly 53 is used for driving the gate 51 to rotate around the pivoting shaft 52, and contents of this part are less associated with the invention, and will not be repeated here.

A working process of the bill recycling mechanism provided by the embodiment is introduced below.

In an initial state, the first door 11 and the second door 12 are all at the closed positions, and the inner opening B is closed by the gate 51.

When the bills are conveyed into the storage space from the part above the rear part of the bill recycling mechanism one by one, the bills are stacked on the first door 11 and the second door 12, and after the bills are stacked, the controller controls the gate driving assembly 53 to drive the gate 51 to open the inner opening B for the user to take the stacked bills through the bill outlet. The controller (not shown in FIG. 8) of the bill recycling mechanism detects the output signal of the detection component 3 after a preset time, if the detection component 3 outputs the first detection signal, it is indicated that there are bills on the bill tray 1, that is, the bills stored on the first door 11 and the second door 12 have not been taken, then the controller controls the gate driving assembly 53 to drive the gate 51 to close the inner opening B, and then controls the motor 21 of the double door driving assembly 2 to rotate along the set direction to drive both the first door 11 and the second door 12 to rotate to the open positions, and the stacked bills fall into the recovered bill storage space. Then, the controller controls the motor 21 to rotate along the direction opposite to the set direction to drive the first door 11 and the second door 12 to rotate to the closed positions to close the recovered bill storage space.

According to the embodiment, the gate is arranged at the opening of the bill recycling mechanism, multiple bills can be taken or recovered at one time after being stacked.

The above is only the preferred embodiment of the invention and not intended to limit the invention, and for those skilled in the art, the invention can have various modifications and variations. Any modifications, equivalent replacements, improvements and the like within the spirit and principle of the invention shall fall within the scope of protection of the invention.

The invention claimed is:

1. A bill recycling mechanism, comprising:

a box body, provided with a bill outlet;

a bill tray, comprising a first door and a second door, which are oppositely arranged, and used for receiving and guiding bills to the bill outlet when the first door and the second door are all at closed positions; and a double door driving assembly, used for driving the first door and the second door to be opened or closed, wherein the first door and the second door are pivotally opened and pivoted into a bill storage space below the first door and the second door, and wherein the bill tray is obliquely arranged, the double door driving assembly is positioned on an upper end side of the bill tray, and a lower end side of the bill tray is communicated with the bill outlet.

2. The bill recycling mechanism according to claim 1, wherein the double door driving assembly comprises a transmission shaft, and a first worm and a second worm, which are axially arranged on the transmission shaft; and a first worm gear which forms a first worm gear-worm set with the first worm is arranged on a hinge of the first door, a second worm gear which forms a second worm gear-worm set with the second worm is arranged on a hinge of the second door, and a turning direction of the first worm is opposite to a turning direction of the second worm.

3. The bill recycling mechanism according to claim 2, wherein the double door driving assembly further comprises a gear fixedly connected with the transmission shaft and a motor in transmission connection with the gear.

4. The bill recycling mechanism according to claim 1, wherein the bill tray is provided with a first stopping side plate arranged on the first door and a second stopping side plate arranged on the second door.

5. The bill recycling mechanism according to claim 1, wherein the box body further comprises a baffle plate on a side, close to the bill outlet, of the bill tray; and a gate sliding way is formed between the baffle plate and the bill outlet, and a gate which opens and closes the bill outlet is arranged along the gate sliding way.

6. The bill recycling mechanism according to claim 5, wherein the gate sliding way is a curved sliding way, the gate is a curved gate, and the bill outlet comprises an outer opening formed in a panel of the box body, a passage wall extending inwards from four sides of the outer opening and an inner opening formed in the tail end of the passage wall and closed by the curved gate.

7. The bill recycling mechanism according to claim 1, further comprising a detection component which is arranged on the bill tray and used for detecting the bill.

8. The bill recycling mechanism according to claim 1, further comprising a rotating shaft arranged above the bill tray, a impeller arranged on the rotating shaft and used for stirring the bills, and a impeller driving assembly in transmission connection with the rotating shaft.

9. The bill recycling mechanism according to claim 1, wherein the bill storage space is formed by the box body with an opening, and the first door and second door of the bill tray are used for closing the opening of the box body.

10. The bill recycling mechanism according to claim 4, wherein the box body further comprises a baffle plate on a side, close to the bill outlet, of the bill tray; and a gate sliding way is formed between the baffle plate and the bill outlet, and a gate which opens and closes the bill outlet is arranged along the gate sliding way.

11. The bill recycling mechanism according to claim 10, wherein the gate sliding way is a curved sliding way, the gate is a curved gate, and the bill outlet comprises an outer opening formed in a panel of the box body, a passage wall extending inwards from four sides of the outer opening and an inner opening formed in the tail end of the passage wall and closed by the curved gate.

* * * * *